United States Patent
Sugihara (10) Patent No.: US 10,352,417 B2
(45) Date of Patent: Jul. 16, 2019

(54) DRIVING APPARATUS THAT DRIVES DRIVEN BODY USING LEAD SCREW, AND IMAGE PICKUP APPARATUS EQUIPPED WITH THIS DRIVING APPARATUS

(71) Applicant: CANON KABUSHIKI KAISHA, Tokyo (JP)

(72) Inventor: Hiroyasu Sugihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 15/813,670

(22) Filed: Nov. 15, 2017

(65) Prior Publication Data

US 2018/0163830 A1  Jun. 14, 2018

(30) Foreign Application Priority Data

Dec. 14, 2016 (JP) .................. 2016-242102

(51) Int. Cl.
*G02B 7/08* (2006.01)
*F16H 25/24* (2006.01)
(Continued)

(52) U.S. Cl.
CPC ............ *F16H 25/24* (2013.01); *F16H 25/20* (2013.01); *G02B 7/08* (2013.01); *G03B 3/02* (2013.01);
(Continued)

(58) Field of Classification Search
CPC .............. G02B 7/08; G03B 3/02; F16H 25/24
(Continued)

(56) References Cited

U.S. PATENT DOCUMENTS 4,669,196 A * 6/1987 Kersey .................... F41G 1/467
33/265
5,207,856 A * 5/1993 May ..................... B01D 29/111
156/425
(Continued)

FOREIGN PATENT DOCUMENTS

JP  2014228568 A  12/2014

OTHER PUBLICATIONS

English translation: Aoshima, JP 2014-228568, Mirror Drive Device and Imaging Device, Dec. 8, 2014.*

*Primary Examiner* — Clayton E. LaBalle
*Assistant Examiner* — Linda B Smith
(74) *Attorney, Agent, or Firm* — Rossi, Kimms & McDowell LLP (57) ABSTRACT

A driving apparatus reduces degradation of driving performance and durability when a driven body is displaced using a lead screw. The lead screw has a lead groove that is formed over first and second members and has first and second surfaces that face to each other in a width direction. The lead screw is rotated by a driving source. A moving member engages with the lead groove, and moves parallel to the lead screw according to rotation of the lead screw. A driven body is displaced between first and second positions according to movement of the moving member. A first energization member energizes the moving member toward the second surface when the moving member passes across a first junction that occurs at a boundary between the first and second members in a stroke where the moving member contacts with a drive surface of the first surface to be moved.

16 Claims, 9 Drawing Sheets (51) Int. Cl.
  *G03B 3/02*    (2006.01)
  *F16H 25/20*   (2006.01)
  *G03B 19/12*   (2006.01)

(52) U.S. Cl.
  CPC ...... *G03B 19/12* (2013.01); *G03B 2205/0053* (2013.01)

(58) Field of Classification Search
  USPC .......................................................... 396/144
  See application file for complete search history.

(56) References Cited

U.S. PATENT DOCUMENTS

| | | | | |
|---|---|---|---|---|
| 5,757,397 | A * | 5/1998 | Hirano | B41J 2/16523 347/30 |
| 5,939,124 | A * | 8/1999 | Wenger | B30B 11/005 426/516 |
| 7,575,296 | B2 * | 8/2009 | Yoshida | B41J 2/16538 347/22 |
| 2002/0135886 | A1 * | 9/2002 | Onda | G02B 7/04 359/694 |
| 2008/0298916 | A1 * | 12/2008 | Jordan | B23B 51/02 408/214 |
| 2010/0121434 | A1 * | 5/2010 | Paul | A61F 2/24 623/2.11 |
| 2010/0124467 | A1 * | 5/2010 | Nordlin | B27G 15/00 408/213 |
| 2018/0014680 | A1 * | 1/2018 | Hanley | A47H 1/142 |

* cited by examiner

DRIVING APPARATUS THAT DRIVES DRIVEN BODY USING LEAD SCREW, AND IMAGE PICKUP APPARATUS EQUIPPED WITH THIS DRIVING APPARATUS

BACKGROUND OF THE INVENTION

Field of the Invention

The present invention relates to a technique of driving a driven body using a lead screw.

Description of the Related Art

Some electronic apparatuses in recent years are provided with a driving apparatus that drives a driven body using a lead screw in order to improve transmission efficiency while saving space. For example, a moving mechanism of a lens unit in an image pickup apparatus employs a lead screw to be used for a zoom action and focusing action of lenses. Moreover, Japanese Laid-Open Patent Publication (Kokai) No. 2014-228568 (JP 2014-228568A) discloses a method of driving a mirror unit by a driving system using a lead screw. Since this is able to reduce a multi-stage gear train mechanism and a cam mechanism, a miniaturization can be attained.

The lead screw used in the above-mentioned driving system has a lead groove. The lead groove consists of a first groove section that is formed at a first lead angle and is used to drivingly turn a mirror and second and third groove sections that are formed at a second lead angle, which is smaller than the first lead angle, and are used to hold the mirror at a mirror-up position and a mirror-down position, respectively. As a result of this, the mirror is available to be held at the mirror-up position and the mirror-down position without supplying electric current to a motor.

However, the lead screw of the above-mentioned publication consists of three separate members including a first member around which the first groove section is formed and second and third members around which the second and third groove sections are formed and that are respectively attached to both ends of the first member. When a lead screw consists of a plurality of different members, very small steps may occur at junctions of different members in the lead groove. There are concerns over issues including wear of the members and inappropriate drive because the very small steps occurred at the junctions disturb smooth slide of a follower member when the follower member slides along the lead groove.

Moreover, according to the technique of the above-mentioned publication, a spring always energizes the spherical follower member in a radial direction of the lead screw, and the follower member certainly slides across the junctions while receiving energization force. Accordingly, the above-mentioned wear may degrade durability and a driving performance. Moreover, since the follower member is always energized in the radial direction, the follower member causes frictional resistance to rotation of the lead screw. This may also affect the durability.

SUMMARY OF THE INVENTION

The present invention provides a technique that reduces degradation of the driving performance and the durability in a case where a driven body is displaced using a lead screw in which a lead groove is formed over a plurality of members.

Accordingly, a first aspect of the present invention provides a driving apparatus including a driving source, a lead screw that has a lead groove that is formed over at least a first member and a second member and has a first surface and a second surface that face to each other in a width direction, the lead screw being rotationally driven by the driving source, a moving member that engages with the lead groove of the lead screw, and moves approximately parallel to the lead screw according to rotation of the lead screw, a driven body that is displaced between a first position and a second position according to movement of the moving member, and a first energization member that energizes the moving member to a side of the second surface at least when the moving member passes across a first junction that occurs at a boundary between the first member and the second member in a stroke where the moving member contacts with a drive surface of the first surface of the lead groove and moves in a direction from a first end to a second end of the lead groove.

Accordingly, a second aspect of the present invention provides an image pickup apparatus including the driving apparatus of the first aspect.

The present invention reduces the degradation of the driving performance and the durability in the case where the driven body is displaced using the lead screw in which the lead groove is formed over the plurality of members.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
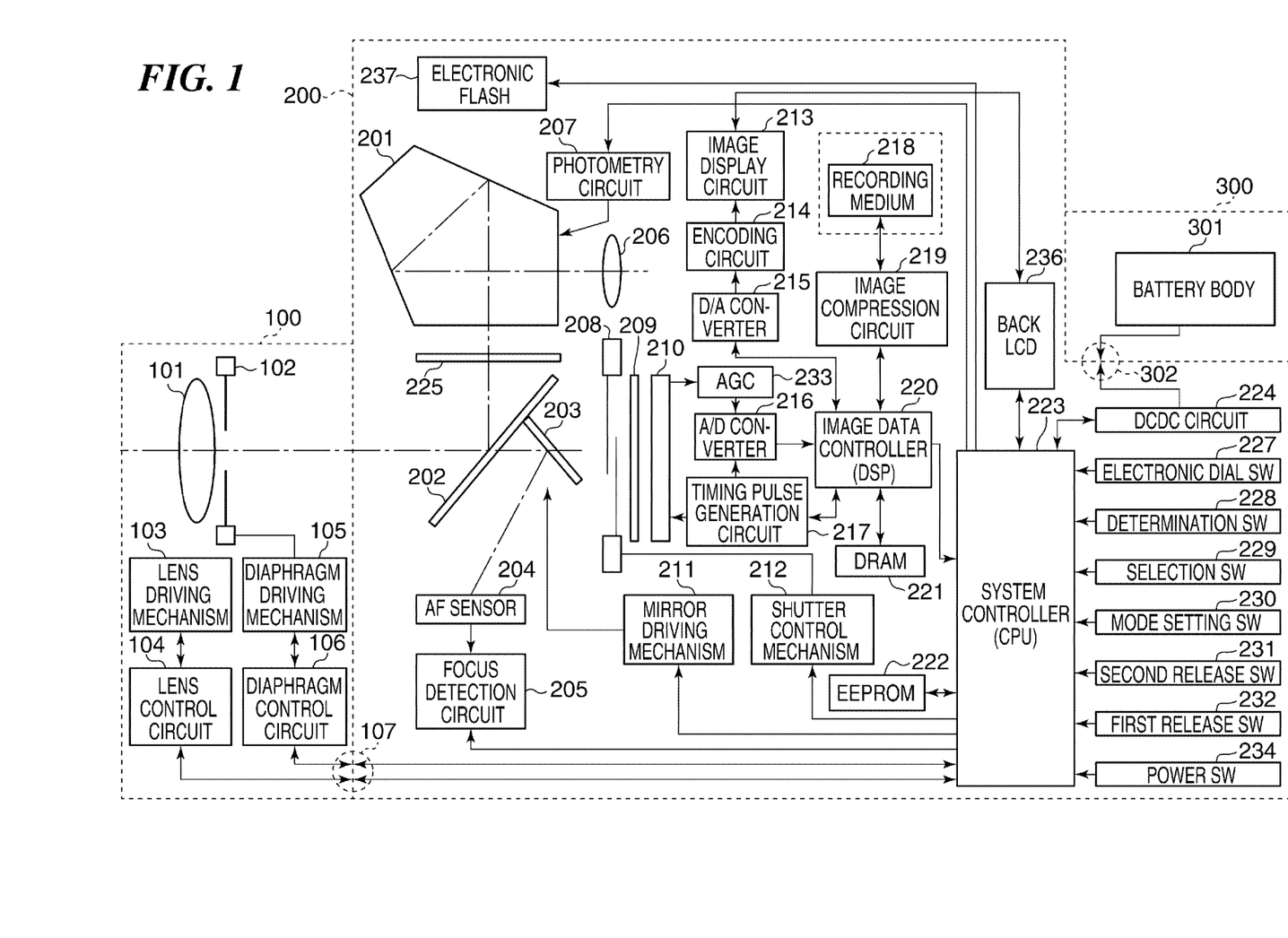
FIG. 1 is a block diagram schematically showing a configuration of an image pickup apparatus to which a driving apparatus according to a first embodiment of the present invention is applied.

FIG. 1 is a block diagram schematically showing a configuration of an image pickup apparatus to which a driving apparatus according to a first embodiment of the present invention is applied. A digital single lens reflex camera is exemplified as this image pickup apparatus. It should be noted that the driving device of the present invention is applicable to various kinds of apparatuses other than the image pickup apparatus.

Figure 2A:
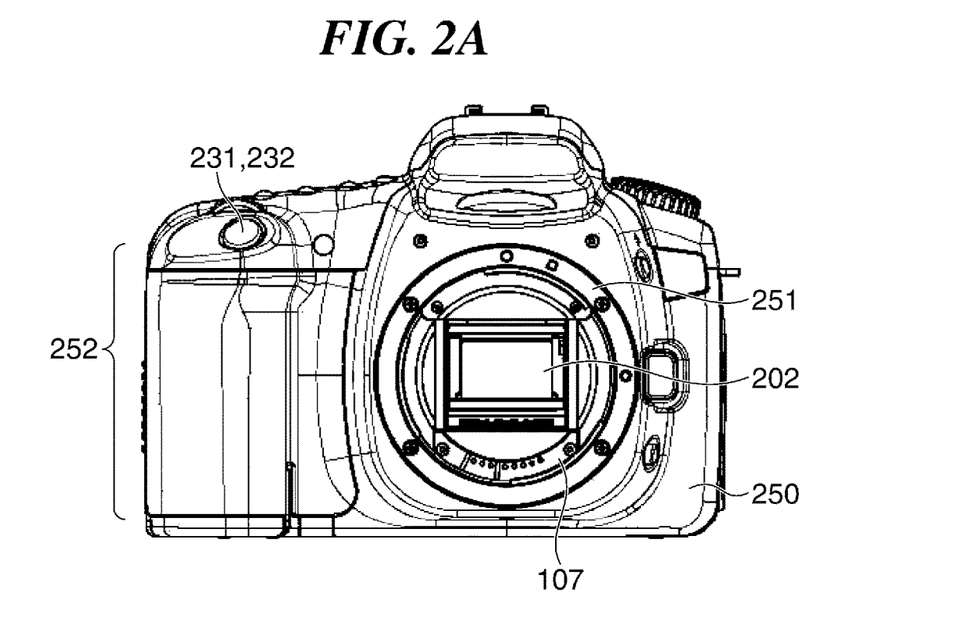
FIG. 2A and FIG. 2B are a front view and a back view showing a camera body that constitutes the image pickup apparatus, respectively.

A lens unit 100 is detachably attached to a camera body 200 of this digital single lens reflex camera through a mount mechanism 251 (FIG. 2A). An electric contact group 107 is provided in a mount mechanism 251. The electric contact group 107 enables communication between the camera body 200 and the lens unit 100, and enables to drive a photographing lens 101 and a diaphragm 102. Moreover, a battery unit 300 is detachably attached to the camera body 200 through an attachment-and-detachment mechanism (not shown). A power-source contact 302 enables communication between the camera body 200 and the battery unit 300, and enables the battery unit 300 to supply electric power to the camera body 200.

A photographing light flux from an object is guided to a main-mirror unit (driven body) 202 that is turnable through the photographing lens 101 and the diaphragm 102. The main-mirror unit 202 is constituted turnable between a mirror-down position (first position) and a mirror-up position (second position). The main-mirror unit is in the mirror-down position in FIG. 1. A center portion of the main-mirror unit 202 is formed as a half mirror. A part of the light flux transmits the half mirror when the main-mirror unit 202 is located at the mirror-down position. The transmitted light flux is reflected by a sub-mirror unit 203 installed in the main-mirror unit 202, and is guided to an AF sensor 204. A detection result of the AF sensor 204 is supplied to a focus detection circuit 205. On the other hand, the photographing light flux reflected by the main-mirror unit 202 forms an image on a focusing screen 225. A photographer can look at the object image formed on the focusing screen 225 through a pentagonal prism 201 and an eyepiece lens 206.

Moreover, when the main-mirror unit 202 is located at the mirror-up position, the light flux from the photographing lens 101 reaches an image sensor 210 through a filter 209 and a focal-plane shutter 208 that is a mechanical shutter. The filter 209 has two functions. One is a function for cutting infrared light to guide only visible light to the image sensor 210. The other is a function as an optical low pass filter. Moreover, the focal-plane shutter 208 has a first curtain and a second curtain, and controls transmission and cutoff of the light flux from the photographing lens 101. It should be noted that the sub-mirror unit 203 is folded so as to face to the main-mirror unit 202 when the main-mirror unit 202 is located at the mirror-up position.

Moreover, this camera is provided with a system controller 223 constituted by a CPU that manages control of the entire camera and controls actions of sections mentioned later. A lens control circuit 104, a diaphragm control circuit 106, a focus detection circuit 205, a mirror driving mechanism 211, a shutter control mechanism 212, a photometry circuit 207, an EEPROM 222, and a DCDC circuit 224 are connected to the system controller 223. The system controller 223 moves the photographing lens 101 in an optical axis direction to adjust focus by controlling a lens driving mechanism 103 through the lens control circuit 104 so as to form an object image on the image sensor 210. The system controller 223 controls a diaphragm driving mechanism 105 that drives the diaphragm 102 on the basis of a set-up Av value through the diaphragm control circuit 106. The photometry circuit 207 is connected to a photometry sensor (not shown) arranged near the eyepiece lens 206. The photometry sensor is a sensor for measuring luminance of an object, and an output is supplied to the system controller 223 through the photometry circuit 207. The EEPROM 222 stores parameters that need to be adjusted when this camera is controlled. The DCDC circuit 224 supplies the electric power to the circuits and a driving section of this camera.

The system controller 223 outputs a control signal to the shutter control mechanism 212 on the basis of a set-up Tv value. A driving source for the first curtain and the second curtain of the focal-plane shutter 208 is constituted by a spring that needs to be charged after travelling the curtains for the next action. The shutter control mechanism 212 controls the charge of the spring. Moreover, the system controller 223 controls the mirror driving mechanism 211 to turn up or down the main-mirror unit 202 and the sub-mirror unit 203. Moreover, an image data controller 220 is connected to the system controller 223. The image data controller 220 is constituted by a DSP (digital signal processor), controls the image sensor 210, and corrects and processes image data input from the image sensor 210 on the basis of an instruction by the system controller 223.

A timing pulse generating circuit 217, an AGC 233, an A/D converter 216, a DRAM 221, a D/A converter 215, and an image compression circuit 219 are connected to the image data controller 220. Moreover, an image display circuit 213 is connected to the D/A converter 215 through an encoder circuit 214. A recording media 218 is connected to the image compression circuit 219. Furthermore, various switches are connected to the system controller 223. The various switches achieve the following functions by user's operations. A power SW 234 switches ON and OFF of the power of this camera. A first release SW 232 is used to start photographing preparation actions, such as photometry and auto-focusing. A second release SW 231 is used to start an image pickup action. A mode setting SW 230 is used to set up a mode so that a user makes this camera perform a desired action. A selection SW 229 is used to select a desired parameter from among various selection parameters. A determination SW 228 is used to determine the selected parameter. An electronic dial SW 227 is used to display parameters so as to go up and down by a rotary action. An electronic flash 237 has a light projecting function of AF auxiliary light and an electronic-flash dimming function. The DCDC circuit 224 is connected to a battery body 301 through the power-source contact 302. The battery body 301 supplies electronic power to the DCDC circuit 224.

Figure 2B:
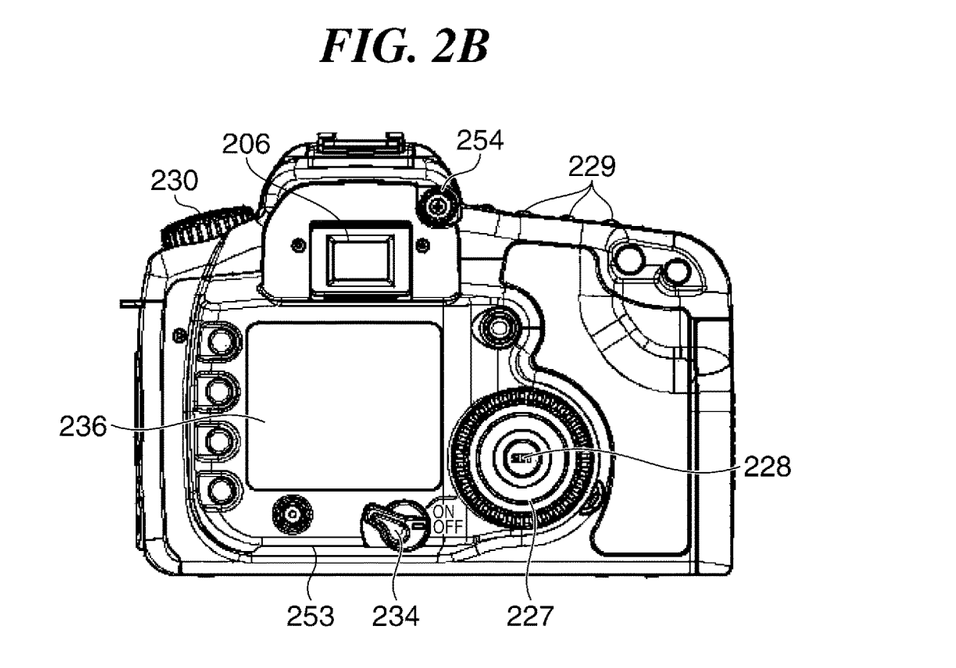

FIG. 2A and FIG. 2B are a front view and a back view showing the camera body 200, respectively. Hereinafter, the object side is a front side and the photographer side is a back side. A right side and left side are defined on the basis of the direction seen from the photographer.

A front exterior member 250 is arranged on the front side of the camera body 200. A mount mechanism 251 to which the lens unit 100 is detachably attached is installed to the front exterior member 250. On the right side of the front exterior member 250, a grip 252 that a user holds the camera body 200 is provided. In an upper portion of the grip 252, the first release SW 232 and the second release SW 231 are provided. The release SWs 232 and 231 are constituted by the same operating member, and output respective signals corresponding to a pushing amount of the operating member. A back exterior member 253 is arranged on the back side of the camera body 200. A back liquid crystal display 236 is fixed to the back exterior member 253, and constitutes a part of the appearance. An eyepiece lens 206 is arranged in the upper portion of the back side of the camera body 200. A diopter adjusting dial 254 is arranged near the eyepiece lens 206.

The power the SW 234 is arranged in a lower part of the back side of the camera body 200. Moreover, an electronic dial SW 227 is arranged on the back side of the camera body 200. The determination SW 228 is arranged at the center of the electronic dial SW 227. The selection SW 206 is arranged on the upper portion of the camera body 200. The mode setting SW 230 is arranged on the upper portion of the camera body 200. A user can set up a mode so as to make this camera perform a desired action by rotating the mode setting SW 230.

Figure 3A:
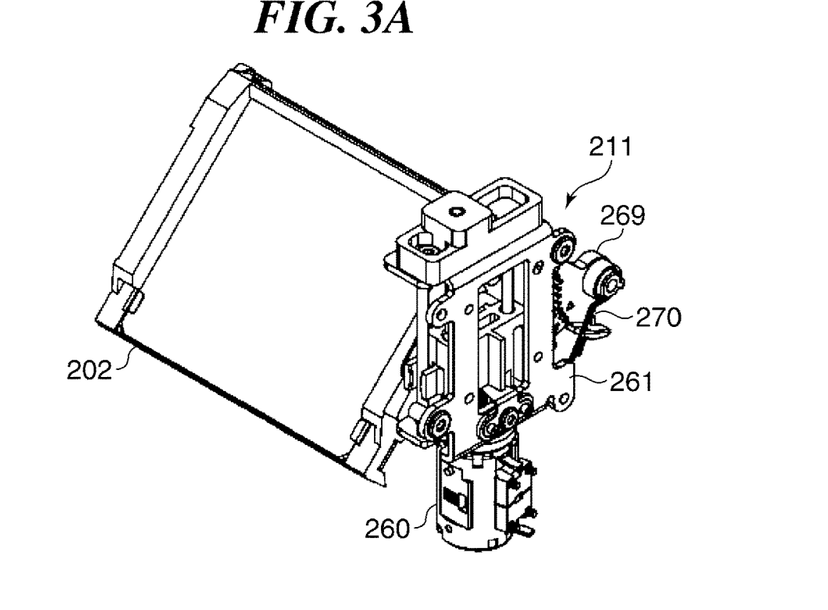
FIG. 3A and FIG. 3B are perspective views showing a mirror driving mechanism and a mirror unit that are included in the camera body shown in FIG. 2A, respectively.
Figure 3B:
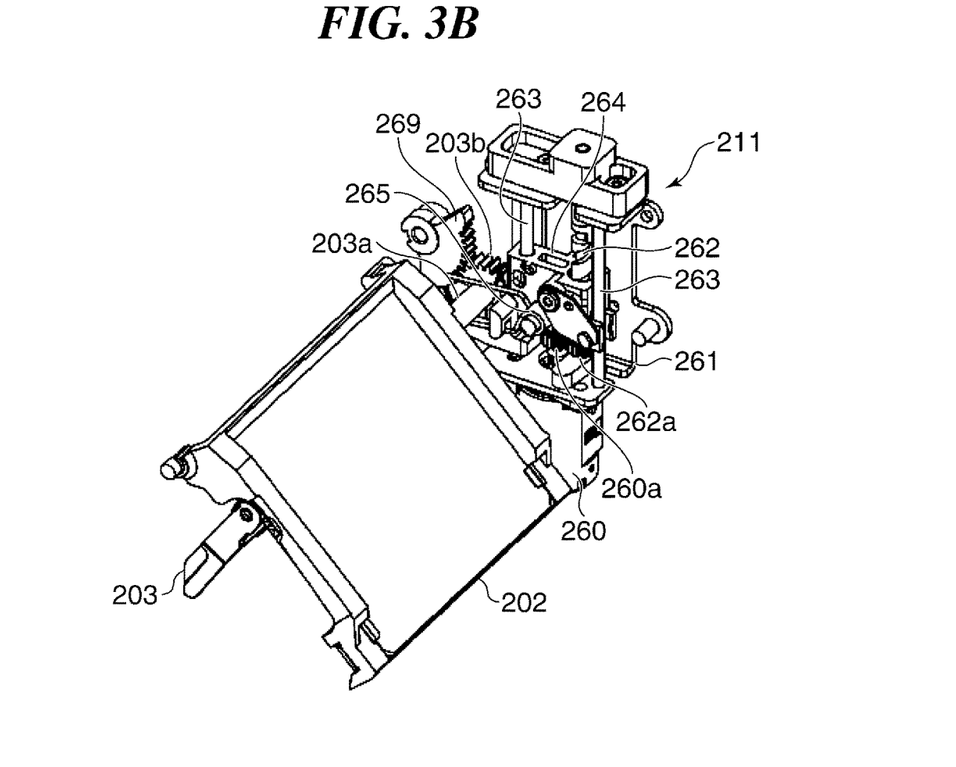

FIG. 3A and FIG. 3B are perspective views showing the mirror driving mechanism 211 and the mirror units 202 and 203. The mirror driving mechanism 211 has a lead screw 262, a step motor 260, a drive-unit base 261, two guide shafts 263, a slider unit 264, a mirror energization spring 265, a sun gear 269, and a sun-gear energization spring 270. The step motor 260 is a driving source that drivingly rotates the lead screw 262.

The main mirror unit 202 is attached to a mirror box (not shown) fixed to the camera body 200, and functions as a mirror member that is turnable between the mirror-down position and the mirror-up position. The sub mirror unit 203 is turnably attached to the main mirror unit 202. Namely, the main mirror unit 202 is turnable around a main-mirror hinge shaft 202a (see FIG. 8A and FIG. 8B). The main mirror unit 202 is provided with a sub-mirror hinge shaft 202b (see FIG. 8A and FIG. 8B), and the sub mirror unit 203 is turnably attached to the sub-mirror hinge shaft 202b. Accordingly, the sub mirror unit 203 is relatively turnable against the main mirror unit 202.

The sub mirror unit 203 is provided with a mirror driving shaft 203a and a planet gear 203b (FIG. 3B) that are coaxial to the turning center of the sub mirror unit 203 (the axial center of the sub-mirror hinge shaft 202b). The planet gear 203b meshes with the sun gear 269 that is rotatably attached to the mirror box (not shown). Since the planet gear 203b meshes with the sun gear 269, the sub mirror unit 203 relatively turns against the main mirror unit 202 in interlocking with the turning of the main mirror unit 202. Thereby, the sub mirror unit 203 is opened to the main mirror unit 202 at a predetermined angle at the mirror-down position (FIG. 8A), and is held in a posture that is closed to the main mirror unit 202 at the mirror-up position (FIG. 8B). It should be noted that the sun-gear energization spring 270 is hooked between the sun gear 269 and the mirror box (not shown) and is energizing the sun gear 269 downward in the turning direction (a counterclockwise direction in FIG. 3A). The energization force of the sun-gear energization spring 270 is transferred as energization force in the turning direction of the sub mirror unit 203 through the planet gear 203b.

The step motor 260, the lead screw 262, and the two guide shafts 263 are attached to the drive-unit base 261. The guide shafts 263 are arranged in parallel to the lead screw 262. The slider unit 264 is attached to the guide shafts 263 so as to enable linear movement parallel to a longitudinal direction (axial direction) of the lead screw 262 approximately. A pinion gear 260a of the step motor 260 meshes with a lead screw gear 262a that is fixed to the lead screw 262 by a method, such as adhesion or press fitting. Accordingly, the power of the step motor 260 is transferred to the lead screw 262. The mirror energization spring 265 is hooked to the slider unit 264. As mentioned below, the main mirror unit 202 receives the energization force from the mirror energization spring 265 through the slider unit 264 at a position near the mirror-up position and a position near the mirror-down position.

Figure 4A:
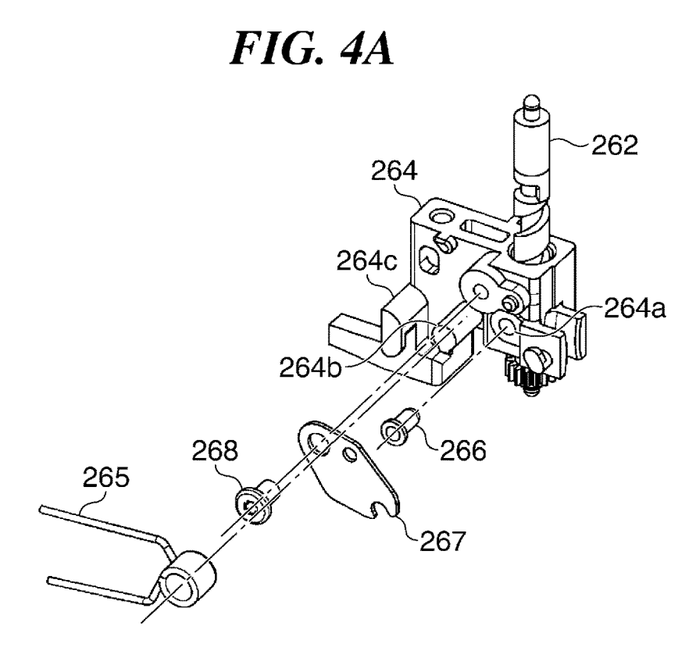
FIG. 4A, FIG. 4B, and FIG. 4C are an exploded view, a right side view, and a sectional view showing the mirror driving mechanism shown in FIG. 3A, respectively.
Figures 4B, 4C:
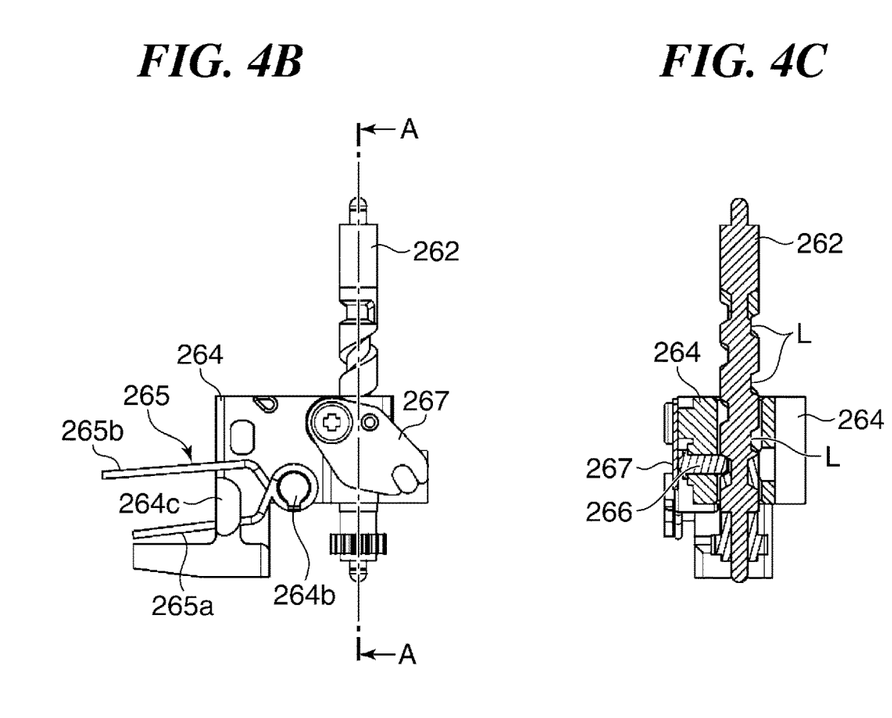

FIG. 4A is an exploded view of the mirror driving mechanism 211. FIG. 4B is a right side view of the mirror driving mechanism 211. FIG. 4C is a sectional view taken along the A-A line in FIG. 4B.

FIG. 4A shows a state where various members are attached to the lead screw 262 under a condition where the lead screw 262 and the slider unit 264 are assembled. A hole 264a for fitting and holding a follower pin 266 is provided in the slider unit 264. The hole 264a is formed so that the center line of the hole 264a intersects with the axial center of the lead screw 262. A follower-pin presser plate 267 is attached with a fastening member 268 from the head side of the follower pin 266, and prevents the follower pin 266 from dropping out from the hole 264a. The follower pin 266 is a moving member that engages with the lead screw 262.

A guide bar 264b and a fixing part 264c are provided in the slider unit 264. The mirror energization spring 265 is a torsion spring with an annular part and two arms 265a and 265b. The mirror energization spring 265 is arranged on the slider unit 264 so that the annular part is fitted to the guide bar 264b and the two arms 265a and 265b nip the fixing part 264c and the mirror driving shaft 203a of the sub mirror unit 203. When the follower pin 266 is fitted into the hole 264a and is held by the follower-pin presser plate 267, the follower pin 266 engages with a lead groove L (FIG. 4C) of the lead screw 262.

The follower pin 266, follower-pin presser plate 267, fastening member 268, and mirror energization spring 265 move linearly together with the slider unit 264 in interlocking with the rotation of the lead screw 262. It should be noted that the follower pin 266 may be formed in the slider unit 264 integrally.

Figure 5A:
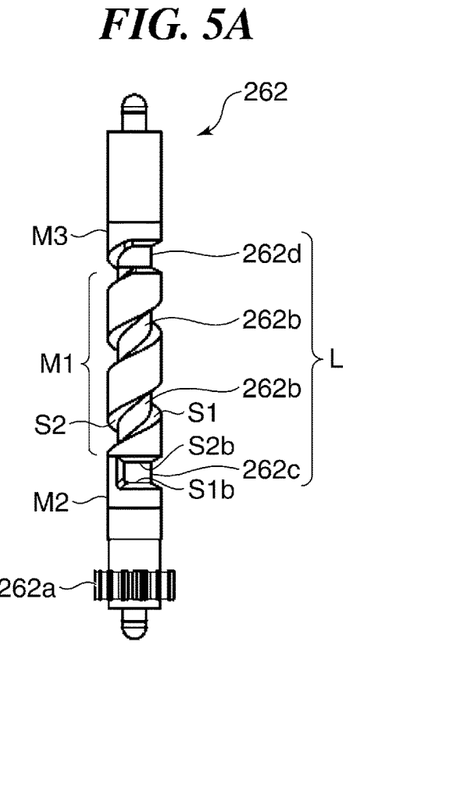
FIG. 5A and FIG. 5B are a front view and a side view showing a lead screw shown in FIG. 4A, respectively.
Figure 5B:
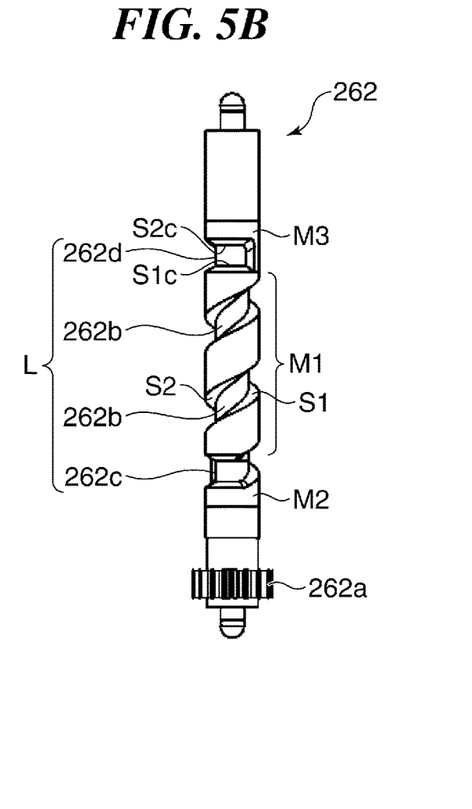
Figure 6A:
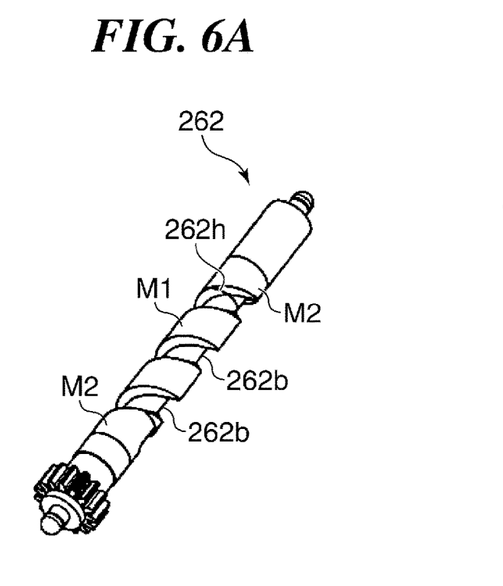
FIG. 6A, FIG. 6B, FIG. 6C, and FIG. 6D are perspective views showing the lead screw shown in FIG. 4A that are viewed from different directions, respectively.
Figure 6B:
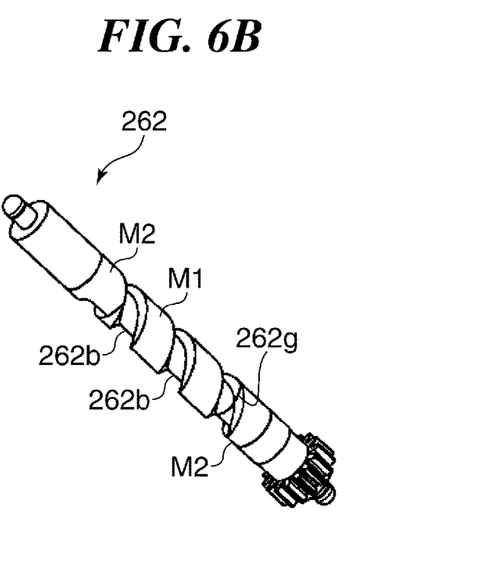
Figure 6C:
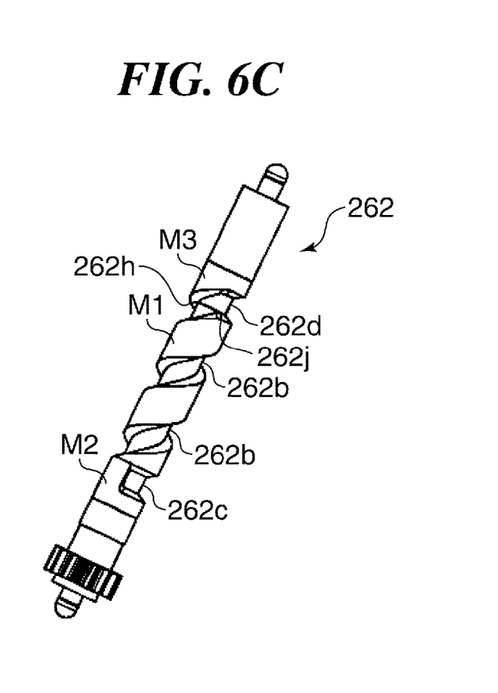
Figure 6D:
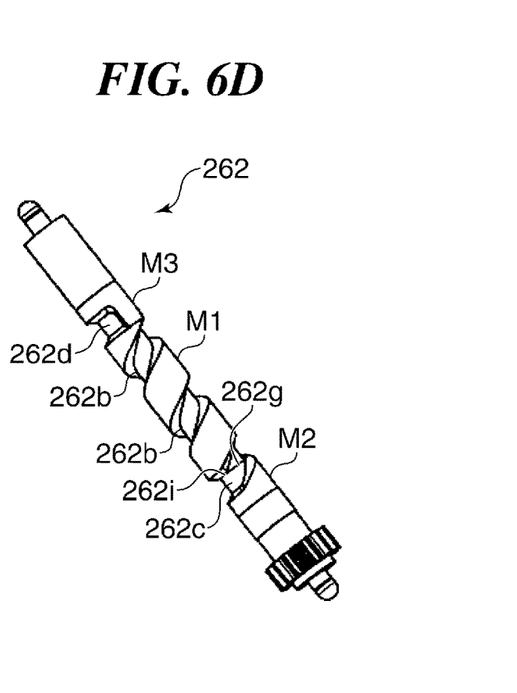
Figure 7:
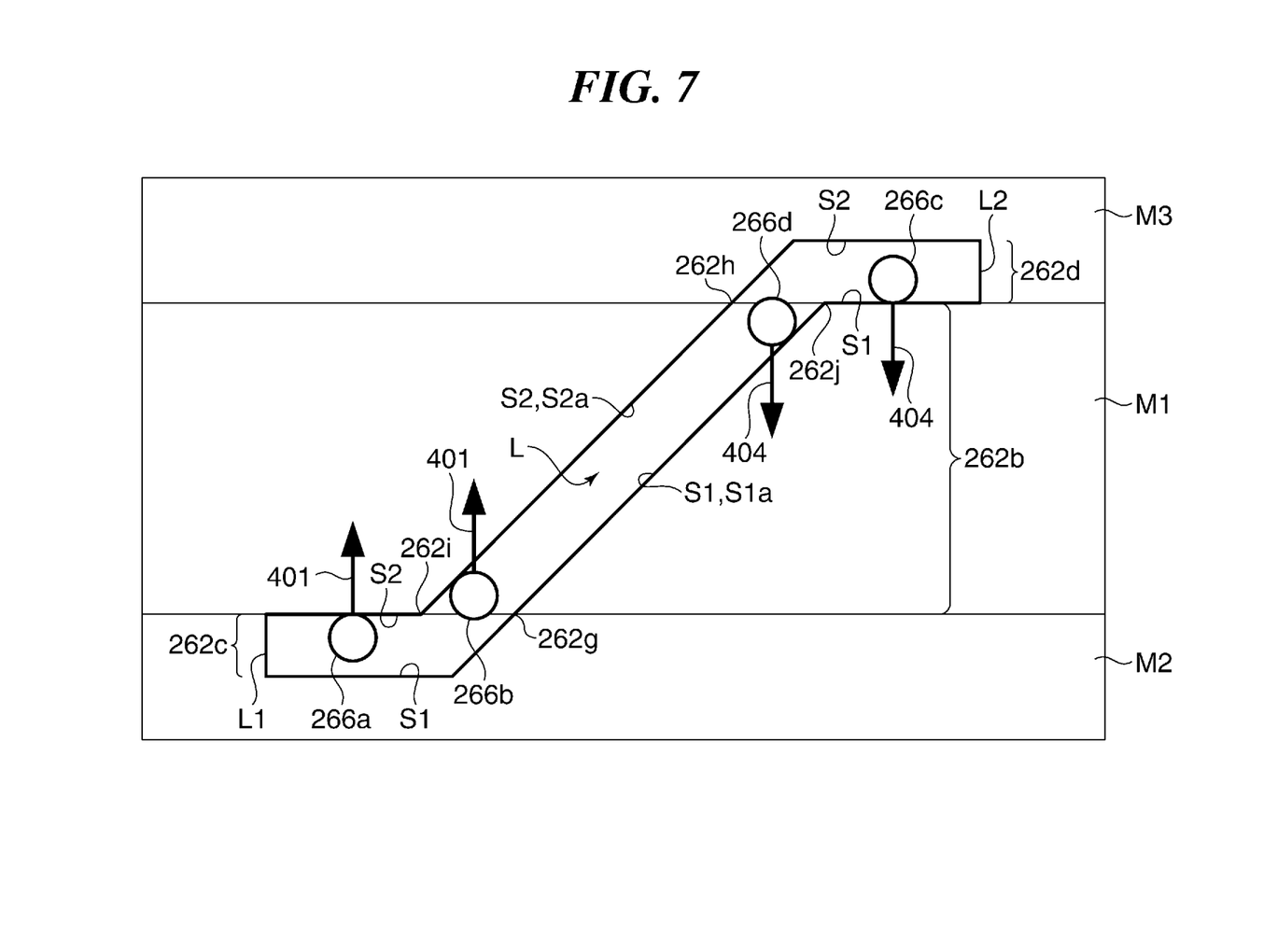
FIG. 7 is a development showing a lead groove of the lead screw shown in FIG. 4A.

FIG. 5A and FIG. 5B are a front view and a side view of the lead screw 262, respectively. FIG. 6A through FIG. 6D are perspective views showing the lead screw 262 that are viewed from different directions. FIG. 7 is a development of the lead groove L of the lead screw 262, and shows engagement relationship with the follower pin 266.

The lead screw 262 mainly consists of first, second, and third members M1, M2, and M3. The second member M2 is joined to a bottom end of the first member M1, which is a shaft used as a substrate of the lead screw 262, and the third member M3 is joined to a top end of the first member M1. The second member M2 and the third member M3 are made from material that is different from material of the first member M1. For example, the first member M1 is made from metal, and the second member M2 and the third member M3 are made from resin. The second member M2 and the third member M3 are joined to the first member M1 by a method, such as integral molding of resin or press fitting. Although the second member M2 and the third member M3 are made from the same material in the embodiment, they may be made from different materials.

The lead groove L is constituted by connecting a third groove section 262d, a first groove section 262b, and a second groove section 262c in order from the top. The first groove section 262b has a predetermined lead angle in order to move the slider unit 264 linearly, and is formed around the first member M1 of the lead screw 262 by a method, such as cutting or form rolling. Each of lead angles of the second groove section 262c and the third groove section 262d is smaller than the lead angle of the first groove section 262b, and is an angle (0 degrees) that makes the second groove section 262c and the third groove section 262d be approximately perpendicular to the axial direction of the lead screw 262.

The second groove section 262c is connected to the bottom end of the first groove section 262b. At the mirror-down position, the follower pin 266 engages with the second groove section 262c, which regulates movement of the follower pin 266 in the axial direction of the lead screw 262 and regulates linear movement of the slider unit 264. Thereby, the main mirror unit 202 and the sub mirror unit 203 are held at the mirror-down position. The third groove section 262d is connected to the top end of the first groove section 262b. At the mirror-up position, the follower pin 266 engages with the third groove section 262d, which regulates movement of the follower pin 266 in the axial direction of the lead screw 262 and regulates linear movement of the slider unit 264. Thereby, the main mirror unit 202 and the sub mirror unit 203 are held at the mirror-up position.

As shown in FIG. 5A, FIG. 5B, and FIG. 7, the lead groove L has a first surface S1 and a second surface S2 that face to each other in the width direction over the whole length. The first surface S1 includes a drive surface S1a that drives the slider unit 264 in a direction from one end (a first end) L1 toward the other end (a second end) L2 in a formation direction of the lead groove L. Moreover, the second surface S2 includes a drive surface S2a that drives the slider unit 264 in a direction from the second end L2 toward the first end L1. Specifically, the portion of the first surface S1 and a portion of the second surface S2 that belong to the first groove section 262b are the drive surfaces S1a and S2a.

The first groove section 262b is formed in the first member M1. The second groove section 262c is formed over the second member M2 and the first member M1, and the third groove section 262d is formed over the third member M3 and the first member M1. In detail, the second surface S2 is formed only in the first member M1 and is not formed in the second member M2 in the second groove section 262c. Moreover, the first surface S1 is formed only in the first member M1 and is not formed in the third member M3 in the third groove section 262d.

Although the second groove section 262c and the first groove section 262b are formed continuously as mentioned above, since those grooves consist of the separate members, a very small step occurs when the positional relationship between the connected members misaligns. That is, a first junction 262g occurs in the boundary section by connecting the second member M2 and the first member M1 (FIG. 6B, FIG. 6D, FIG. 7). Similarly, a second junction 262h occurs in the boundary section by connecting the third member M3 and the first member M1 about the third groove section 262d and the first groove section 262b (FIG. 6A, FIG. 6C, FIG. 7). The first junction 262g occurs in the first surface S1 near the first end L1 of the lead groove L. The second junction 262h occurs in the second surface S2 near the second end L2 of the lead groove L. When the follower pin 266 slides across the junctions 262g and 262h, problems, such as wear and driving failure, are concerned.

On the other hand, a ridgeline 262i appears at the boundary between the first groove section 262b and the second groove section 262c in the second surface S2. As mentioned above, since the second surface S2 is not formed in the second member M2, the ridgeline 262i appears only in the first member M1. The position of the ridgeline 262i approximately coincides with the junction 262g in the longitudinal direction of the lead screw 262. Similarly, a ridgeline 262j appears at the boundary between the first groove section 262b and the third groove section 262d. As mentioned above, since the first surface S1 is not formed in the third member M3, the ridgeline 262j appears only in the first member M1. The position of the ridgeline 262j approximately coincides with the junction 262h in the longitudinal direction of the lead screw 262.

Figure 8A:
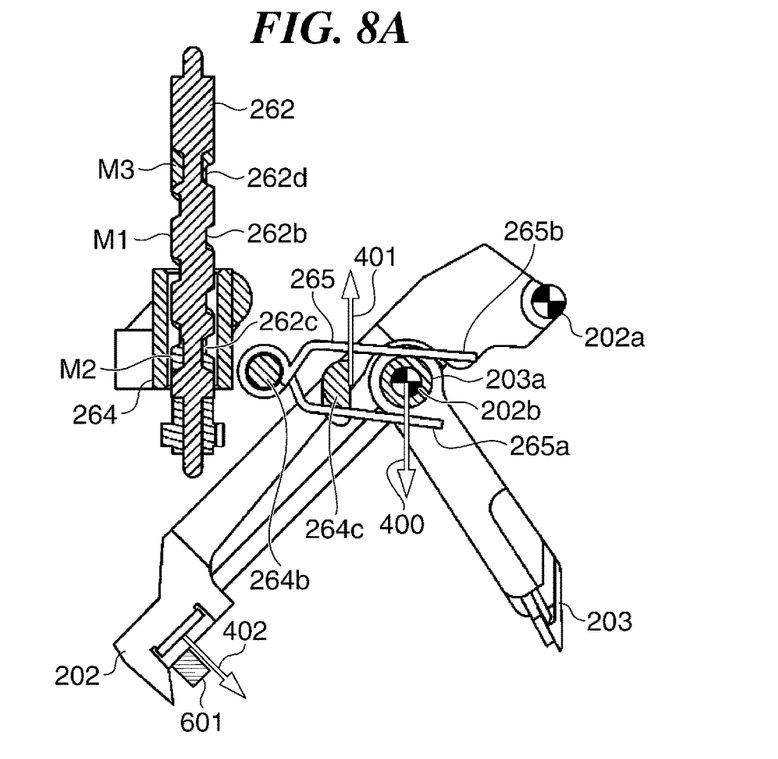
FIG. 8A and FIG. 8B are schematic views showing a mirror-down state and a mirror-up state of the mirror driving mechanism shown in FIG. 3A, respectively.
Figure 8B:
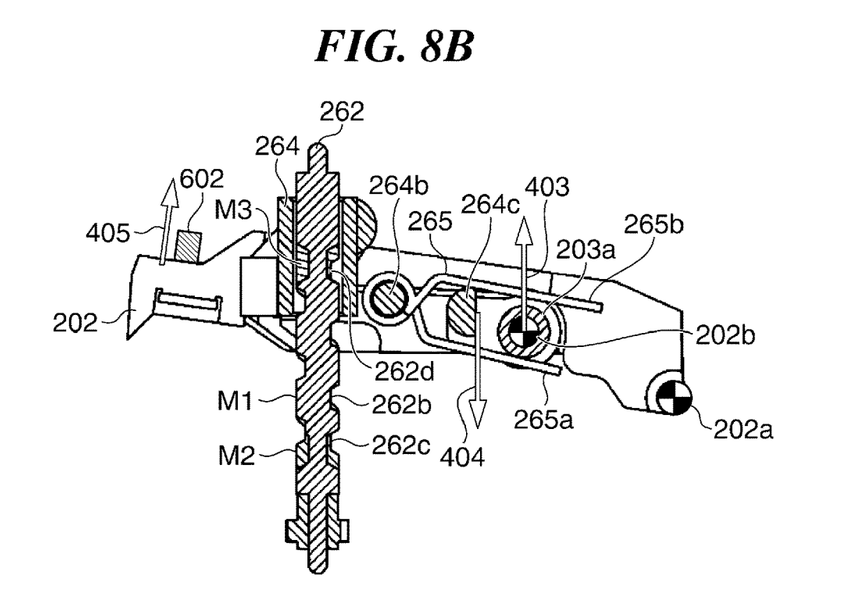

FIG. 8A and FIG. 8B are schematic views respectively showing a mirror-down state and a mirror-up state of the main mirror unit 202 driven by the mirror driving mechanism 211.

Operations of the slider unit 264 and the main mirror unit 202 by rotation of the lead screw 262 will be described with reference to FIG. 7, FIG. 8A, and FIG. 8B. FIG. 7 shows energizing directions at positions 266a, 266b, 266c, and 266d of the follower pin 266. The introduction position 266b is a position near the junction 262g at the side of the second end L2. The introduction position 266d is a position near the junction 262h at the side of the first end L1. The standby position 266a is a position in the second groove section 262c. The standby position 266c is a position in the third groove section 262d.

When the lead screw 262 rotates in a counterclockwise direction viewed from the upper side in FIG. 8A, the follower pin 266 moves toward the first end L1 from the second end L2 inside the lead groove L. The slider unit 264 goes down in a moving stroke (hereinafter referred to as a "down stroke") of the follower pin 266 towards the first end L1 from the second end L2. Corresponding to this, the main mirror unit 202 is displaced from the mirror-up position to the mirror-down position. When the lead screw 262 rotates in a clockwise direction viewed from the upper side in FIG. 8A on the contrary, the follower pin 266 moves toward the second end L2 from the first end L1 inside the lead groove L. The slider unit 264 goes up in a moving stroke (hereinafter referred to as an "up stroke") of the follower pin 266 towards the second end L2 from the first end L1. Corresponding to this, the main mirror unit 202 is displaced from the mirror-down position to the mirror-up position.

The action in the down stroke when the follower pin 266 is in an intermediate position in the formation direction of the lead groove L will be described as follows. In the down stroke, the follower pin 266 is driven mainly by the drive surface S2a of the first groove section 262b and goes down. The follower pin 266 approaches the first end L1 when the lead screw 262 rotates in the counterclockwise direction. The main mirror unit 202 turns toward the mirror-down position because the mirror driving shaft 203a of the sub mirror unit 203 is driven by the arm 265b of the mirror energization spring 265. The energization force that is applied to the mirror driving shaft 203a in a direction of an arrow 400 is a moment around the main-mirror hinge shaft 202a, and is mirror-down energization force in a direction of an arrow 402 at the front end of the main mirror unit 202 (FIG. 8A).

When coming into contact with a stopper 601 (FIG. 8A) presently, the main mirror unit 202 is regulated at the mirror-down position. Since the turn of the main mirror unit 202 is regulated, the mirror driving shaft 203a is not displaced. Accordingly, when the lead screw 262 rotates furthermore, the fixing part 264c of the slider unit 264 pushes the arm 265a of the mirror energization spring 265. This charges the mirror energization spring 265 and energization force occurs. That is, reaction force from the mirror energization spring 265 acts on the slider unit 264 in a direction of an arrow 401. In this state, the mirror energization spring 265 keeps generation of the energization force to the mirror driving shaft 203a in the direction of the arrow 400. The function of the reaction force in the direction of the arrow 401 continues until the follower pin 266 reaches the first end L1 after the main mirror unit 202 contacts with the stopper 601 (FIG. 8A). After the follower pin 266 passes through the position of the junction 262g, when the follower pin 266 arrives at the first end L1 (or the standby position 266a), the rotation of the lead screw 262 stops. It should be noted that the position of the follower pin 266 shall be defined as a gravity center position of the follower pin 266 or the nearest part of the follower pin 266 to the junction 262g about the positional relationship between the follower pin 266 and the junction 262g.

When the lead screw 262 is reversed and starts rotating in the clockwise direction after that, the action is changed to the up stroke during which the follower pin 266 moves toward the second end L2 from the first end L1. At this time, if there is no reaction force in the direction of the arrow 401, the follower pin 266 will contact with the first surface S1. However, the function of the reaction force in the direction of the arrow 401 continues also at the beginning after the action is changed to the up stroke in the embodiment. That is, since the follower pin 266 continues to be energized towards the second surface S2 in a period during which the follower pin 266 moves between the introduction position 266b and the standby positions 266a, the follower pin 266 contacts with the second surface S2 and is always separated from the first surface S1. Since the follower pin 266 does not contact with the first surface S1, the follower pin 266 does not slide across the junction 262g. Particularly, the follower pin 266 does not contact with the junction 262g when the follower pin 266 passes through the position of the junction 262g in the up stroke from the standby position 266a. Accordingly, even if a step has occurred in the junction 262g, there is no trouble in smooth movement of the follower pin 266.

The action in the up stroke when the follower pin 266 is in an intermediate position in the formation direction of the lead groove L will be described as follows. In the up stroke, the follower pin 266 is driven mainly by the drive surface S1a of the first groove section 262b and goes up. The follower pin 266 approaches the second end L2 when the lead screw 262 rotates in the clockwise direction. The main mirror unit 202 turns toward the mirror-up position because the mirror driving shaft 203a of the sub mirror unit 203 is driven by the arm 265a of the mirror energization spring 265. That is, the energization force that is applied to the mirror driving shaft 203a in a direction of an arrow 403 is a moment around the main-mirror hinge shaft 202a, and is mirror-up energization force in a direction of an arrow 405 at the front end of the main mirror unit 202 (FIG. 8B).

When coming into contact with a stopper 602 (FIG. 8B) presently, the main mirror unit 202 is regulated at the mirror-up position. Since the turn of the main mirror unit 202 is regulated, the mirror driving shaft 203a is not displaced. Accordingly, when the lead screw 262 rotates furthermore, the fixing part 264c of the slider unit 264 pushes the arm 265b of the mirror energization spring 265. This charges the mirror energization spring 265 and energization force occurs. That is, reaction force from the mirror energization spring 265 acts on the slider unit 264 in a direction of an arrow 404. In this state, the mirror energization spring 265 keeps generation of the energization force to the mirror driving shaft 203a in the direction of the arrow 403. The function of the reaction force in the direction of the arrow 404 continues until the follower pin 266 reaches the second end L2 after the main mirror unit 202 contacts with the stopper 602 (FIG. 8B). After the follower pin 266 passes through the position of the junction 262h, when the follower pin 266 arrives at the second end L2 (or the standby position 266c), the rotation of the lead screw 262 stops.

When the lead screw 262 is reversed and starts rotating in the counterclockwise direction after that, the action is changed to the down stroke during which the follower pin 266 moves toward the first end L1 from the second end L2. At this time, if there is no reaction force in the direction of the arrow 404, the follower pin 266 will contact with the second surface S2. However, the function of the reaction force in the direction of the arrow 404 continues also at the beginning after the action is changed to the down stroke in the embodiment. That is, since the follower pin 266 continues to be energized towards the first surface S1 in a period during which the follower pin 266 moves between the introduction position 266d and the standby positions 266c, the follower pin 266 contacts with the first surface S1 and is separated from the second surface S2. Since the follower pin 266 does not contact with the second surface S2, the follower pin 266 does not slide across the junction 262h. Particularly, the follower pin 266 does not contact with the junction 262h when the follower pin 266 passes through the position of the junction 262h in the down stroke from the standby position 266c. Accordingly, even if a step has occurred in the junction 262h, there is no trouble in smooth movement of the follower pin 266.

As mentioned above, the energization of the mirror energization spring 265 prevents the slide of the follower pin 266 across the junctions 262g and 262h that may have a very small step. On the other hand, the mirror energization spring 265 is not charged in the moving range of the follower pin 266 corresponding to the turning range within which the main mirror unit 202 does not contact with the stoppers 601 and 602. Accordingly, although the follower pin 266 contacts with the first surface S1 or the second surface S2 according to the rotation of the lead screw 262, the follower pin 266 is not pushed with superfluous force, which reduces wear.

According to the embodiment, at least when the follower pin 266 of the slider unit 264 passes across the junction 262g in the up stroke, the mirror energization spring 265 energizes the follower pin 266 of the slider unit 264 to the side of the second surface S2. Moreover, at least when the follower pin 266 passes across the junction 262h in the down stroke, the mirror energization spring 265 energizes the follower pin 266 of the slider unit 264 to the side of the first surface S1. Particularly, the energization by the mirror energization spring 265 continues until the follower pin 266 has passed across the junctions 262g and 262h, which certainly prevents the follower pin 266 from contacting with the junctions 262g and 262h. Accordingly, the problem that the follower pin 266 does not slide along the lead groove L smoothly, the problems of wear of parts and inappropriate drive are solved. This reduces the degradation of the driving performance and the durability in the case where the mirror unit 200 is turnably displaced using the lead groove L that is formed over the plurality of members.

Moreover, since the second surface S2 is not formed in the second member M2, the second surface S2 is formed only in the first member M1 from the first groove section 262b to the second groove section 262c. Thereby, since there is no junction in the second surface S2 near the first end L1, driving failure hardly occurs when the follower pin 226 slides on the second surface S2 while receiving the energization force to the side of the second surface S2. Similarly, since the first surface S1 is not formed in the third member M3, the first surface S1 is formed only in the first member M1 from the first groove section 262b to the third groove section 262d. Thereby, since there is no junction in the first surface S1 near the second end L2, driving failure hardly occurs when the follower pin 226 slides on the first surface S1 while receiving the energization force to the side of the first surface S1.

Moreover, there is a period during which the mirror energization spring 265 does not generate the energization force to the slider unit 264 in the up stroke until the follower pin 266 reaches the second end L2 after the follower pin 266 finishes passing across the junction 262g. Similarly, there is a period during which the mirror energization spring 265 does not generate the energization force to the slider unit 264 in the down stroke until the follower pin 266 reaches the first end L1 after the follower pin 266 finishes passing across the junction 262h. Accordingly, the slider unit 264 moves smoothly along the lead groove L without receiving unnecessary force.

Moreover, since the lead angle of the second groove section 262c and the third groove section 262d is smaller than the lead angle of the first groove section 262b, the main mirror unit 202 is held in the mirror-up position or the mirror-down position stably without supplying electric current.

Moreover, since the mirror energization spring 265 is employed as a common elastic member that has a function of a first energization member that energizes the follower pin 266 to the side of the second surface S2 and a function of a second energization member that energizes the follower pin 266 to the side of the first surface S1, the configuration is simple.

Figure 9A:
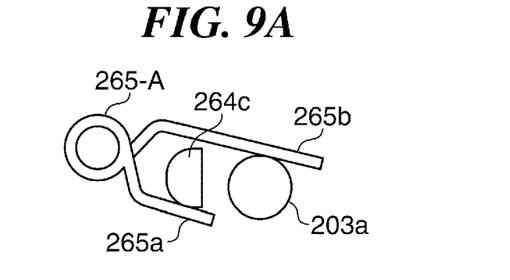
FIG. 9A and FIG. 9B are schematic views showing a first modification of the energization member of the driving apparatus of the present invention.
Figure 9B:
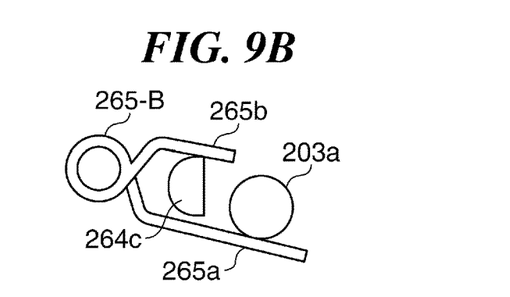

FIG. 9A and FIG. 9B are schematic views showing a first modification of the energization member of the driving apparatus of the present invention. It should be noted that a mirror energization spring 265-A (FIG. 9A) as the first energization member that energizes the follower pin 266 to the side of the second surface S2 and a mirror energization spring 265-B (FIG. 9B) as the second energization member that energizes the follower pin 266 to the side of the first surface S1 are constituted as separate members in the first modification. The mirror energization spring 265-A and the mirror energization spring 265-B are arranged in piles.

In the embodiment, it is described that the slider unit 264 including the follower pin 266 is energized when the follower pin 266 passes across the junctions 262g and 262h. However, a configuration that generates the energization force when the follower pin 266 passes across only one of the junctions 262g and 262h may be employed. For example, the lead screw 262 shall consist of only two members including the first member M1 and the second member M2 but not three members. In this case, since the junction 262h does not occur, the follower pin 266 may be energized so that the follower pin 266 does not contact with the junction 262g at least when passing across the junction 262g in the up stroke.

Figure 9C:
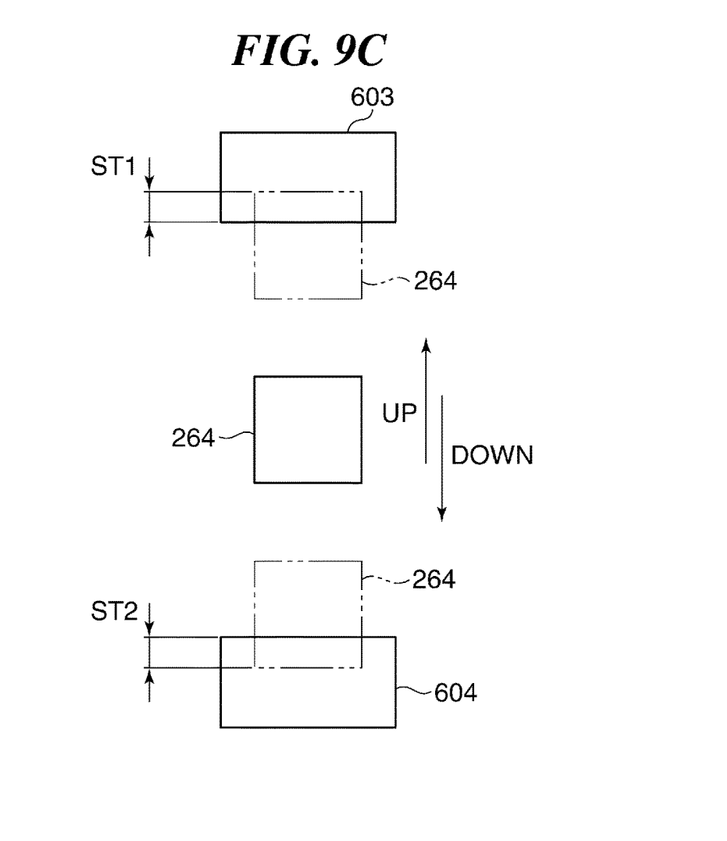
FIG. 9C is a schematic view showing a second modification of the energization member of the driving apparatus of the present invention.

FIG. 9C is a schematic view showing a second modification of the energization member of the driving apparatus of the present invention. The energization member, which generates the energization force to the slider unit 264, is not limited to the mirror energization spring 265. As shown in FIG. 9C, elastic stoppers 603 and 604 that gives reaction force (energization force) to movement of the slider unit 264 may be employed. In place of the mirror energization spring 265, the elastic stopper 603 is provided near the end in the moving direction corresponding to the up stroke of the slider unit 264 and the elastic stopper 604 is provided near the end in the moving direction corresponding to the down stroke.

In the up stroke, when the slider unit 264 contacts with the elastic stopper 603, the elastic stopper 603 deforms elastically and generates downward reaction force to the slider unit 264. This reaction force becomes energization force that energizes the follower pin 266 to the side of the first surface S1. The elastic stopper 603 is designed so that the junction 262h is located within a range of a stroke ST1 in which the follower pin 266 receives the energization force.

Similarly, in the down stroke, when the slider unit 264 contacts with the elastic stopper 604, the elastic stopper 604 deforms elastically and generates upward reaction force to the slider unit 264. This reaction force becomes energization force that energizes the follower pin 266 to the side of the second surface S2. The elastic stopper 604 is designed so that the junction 262g is located within a range of a stroke ST2 in which the follower pin 266 receives the energization force. It should be noted that the stoppers 601 and 602 for regulating the turning of the main mirror unit 202 are unnecessary in the second modification.

The embodiment employs the configuration that the follower pin 266 is energized so as to separate from the junctions 262g and 262h when the follower pin 266 passes across the junctions 262g and 262h. However, if a driving-and-driven relation between the follower pin 266, the first surface S1, and the second surface S2 is taken into consideration, the follower pin 266 does not usually contact with the junction 262h in the up stroke even if there is no energization force. Similarly, the follower pin 266 does not contact with the junction 262g in the down stroke. Accordingly, it is enough that the follower pin 266 is energized to the side of the second surface S2 near the first end L1, at least when the follower pin 266 passes across the junction 262g. Similarly, it is enough that the follower pin 266 is energized to the side of the first surface S1 near the second end L2, at least when the follower pin 266 passes across the junction 262h.

It should be noted that the driven body that is driven by the lead screw 262 through the movement of the follower pin 266 is not limited to what is rotationally displaced like the main mirror unit 202, it may be what is linearly displaced, for example, in the embodiment or the modified examples.

Although it is ideal that the follower pin 266 does not contact with the junctions 262g and 262h at all according to the energization force, it is not indispensable. That is, when the energization force between the follower pin 266 and the junctions 262g and 262h merely becomes weaker, the degradation of the driving performance and the durability in the case where the driven body is displaced are reduced.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-242102, filed Dec. 14, 2016, which is hereby incorporated by reference herein in its entirety.

What is claimed is:
1. A driving apparatus comprising:
a driving source;
a lead screw that has a lead groove that is formed over at least a first member and a second member and has a first surface and a second surface that face to each other in a width direction, said lead screw being rotationally driven by said driving source;
a moving member that engages with the lead groove of said lead screw, and moves approximately parallel to said lead screw according to rotation of said lead screw;
a driven body that is displaced between a first position and a second position according to movement of said moving member; and
a first energization member that energizes said moving member to a side of the second surface at least when said moving member passes across a first junction that occurs at a boundary between the first member and the second member in a stroke where said moving member contacts with a drive surface of the first surface of the lead groove and moves in a direction from a first end to a second end of the lead groove,
wherein there is a period during which said first energization member does not generate the energization force to said moving member in the stroke where said moving member moves in the direction from the first end to the second end of the lead groove until said moving member reaches the second end after said moving member finishes passing across the first junction.

2. The driving apparatus according to claim 1, wherein said moving member separates from the first junction by energization force of said first energization member at least when said moving member passes across the first junction in the stroke where said moving member moves in the direction from the first end to the second end of the lead groove.

3. The driving apparatus according to claim 1, wherein said first energization member continues to energize said moving member to the side of the second surface until said moving member has passed across the first junction in the stroke where said moving member moves in the direction from the first end to the second end of the lead groove.

4. The driving apparatus according to claim 1, wherein the second surface is not formed in the second member.

5. The driving apparatus according to claim 1, wherein the lead groove is formed over at least the first member, the second member, and a third member,
wherein the second surface of the lead groove includes a drive surface that drives said moving member from the side of the second end toward the first end in a formation direction of the lead groove, and
wherein a second junction occurs at a boundary between the first member and the third member in the second surface,
further comprising a second energization member that energizes said moving member to a side of the first surface at least when said moving member passes across the second junction in a stroke where said moving member moves in a direction from the second end to the first end of the lead groove.

6. The driving apparatus according to claim 1, wherein material of the second member differs from material of the first member.

7. The driving apparatus according to claim 1, wherein a lead angle at the first end of the lead groove and a lead angle at the second end of the lead groove are smaller than a lead angle in a section between the first end and the second end.

8. The driving apparatus according to claim 1, wherein said driven body is a mirror in an image pickup apparatus, and
wherein the first position is a mirror-down position and the second position is a mirror-up position.

9. The driving apparatus according to claim 5, wherein said moving member separates from the second junction by energization force of said second energization member at least when said moving member passes across the second junction in the stroke where said moving member moves in the direction from the second end to the first end of the lead groove.

10. The driving apparatus according to claim 5, wherein said second energization member continues to energize said moving member to the side of the first surface until said moving member has passed across the second junction in the stroke where said moving member moves in the direction from the second end to the first end of the lead groove.

11. The driving apparatus according to claim 5, wherein said first surface is not formed in the third member.

12. The driving apparatus according to claim 5, wherein there is a period during which said second energization member does not generate the energization force to said moving member in the stroke where said moving member moves in the direction from the second end to the first end of the lead groove until said moving member reaches the first end after said moving member finishes passing across the second junction.

13. The driving apparatus according to claim 5, wherein said first energization member and said second energization member are constituted by a common elastic member.

14. The driving apparatus according to claim 5, wherein material of the third member differs from material of the first member.

15. The driving apparatus according to claim 13, wherein the common elastic member is a torsion spring that is arranged so that two arms of the torsion spring nip a part fixed to said moving member and a part of said driven body.

16. An image pickup apparatus comprising:
a driving apparatus comprising:
a driving source;
a lead screw that has a lead groove that is formed over at least a first member and a second member and has a first surface and a second surface that face to each other in a width direction, said lead screw being rotationally driven by said driving source;
a moving member that engages with the lead groove of said lead screw, and moves approximately parallel to said lead screw according to rotation of said lead screw;
a driven body that is displaced between a first position and a second position according to movement of said moving member; and
a first energization member that energizes said moving member to a side of the second surface at least when said moving member passes across a first junction that occurs at a boundary between the first member and the second member in a stroke where said moving member contacts with a drive surface of the first surface of the lead groove and moves in a direction from a first end to a second end of the lead groove,
wherein there is a period during which said first energization member does not generate the energization force to said moving member in the stroke where said moving member moves in the direction from the first end to the second end of the lead groove until said moving member reaches the second end after said moving member finishes passing across the first junction.

* * * * *